(12) United States Patent
Keis et al.

(10) Patent No.: US 8,402,522 B1
(45) Date of Patent: Mar. 19, 2013

(54) SYSTEM AND METHOD FOR MANAGING SERVICES AND JOBS RUNNING UNDER PRODUCTION IDS WITHOUT EXPOSING PASSWORDS FOR THE PRODUCTION IDS TO HUMANS

(75) Inventors: Andrei Keis, Fort Lee, NJ (US); Indur Mandhyan, Princeton, NJ (US)

(73) Assignee: Morgan Stanley, New York, NY (US)

( * ) Notice: Subject to any disclaimer, the term of this patent is extended or adjusted under 35 U.S.C. 154(b) by 1020 days.

(21) Appl. No.: 12/148,148

(22) Filed: Apr. 17, 2008

(51) Int. Cl.
 *G06F 21/00* (2006.01)
(52) U.S. Cl. ......... 726/6; 726/4; 726/5; 726/18; 726/19; 726/20
(58) Field of Classification Search .................. None
 See application file for complete search history.

(56) References Cited

U.S. PATENT DOCUMENTS

| | | | |
|---|---|---|---|
| 6,182,220 B1 | 1/2001 | Chen et al. | |
| 6,408,389 B2 | 6/2002 | Grawrock et al. | |
| 7,171,679 B2 | 1/2007 | Best et al. | |
| 7,200,864 B1 | 4/2007 | Hollingsworth | |
| 7,278,024 B2 | 10/2007 | Sundararajan et al. | |
| 7,302,581 B2 | 11/2007 | Utsumi et al. | |
| 7,350,022 B2 | 3/2008 | Mizuno et al. | |
| 7,373,517 B1 * | 5/2008 | Riggins | 713/184 |
| 2006/0037066 A1 * | 2/2006 | Audebert | 726/5 |
| 2007/0074038 A1 | 3/2007 | Arenburg et al. | |
| 2007/0130463 A1 | 6/2007 | Law et al. | |
| 2007/0143830 A1 | 6/2007 | Abraham et al. | |
| 2007/0157032 A1 | 7/2007 | Paganetti et al. | |
| 2007/0186115 A1 | 8/2007 | Gao et al. | |
| 2007/0220253 A1 | 9/2007 | Law | |
| 2007/0220271 A1 | 9/2007 | Law | |
| 2007/0245150 A1 | 10/2007 | Lu et al. | |
| 2007/0250923 A1 | 10/2007 | M'Raihi | |
| 2007/0294749 A1 | 12/2007 | Nice et al. | |
| 2008/0010453 A1 | 1/2008 | Hamid | |
| 2008/0013537 A1 * | 1/2008 | Dewey et al. | 370/390 |
| 2008/0028232 A1 | 1/2008 | Bender | |
| 2008/0034216 A1 | 2/2008 | Law | |
| 2008/0046982 A1 * | 2/2008 | Parkinson | 726/5 |
| 2008/0052524 A1 | 2/2008 | Cedar et al. | |
| 2008/0052777 A1 | 2/2008 | Kawano et al. | |
| 2008/0066167 A1 | 3/2008 | Andri | |
| 2008/0072303 A1 | 3/2008 | Syed | |

* cited by examiner

*Primary Examiner* — Ghazal Shehni
(74) *Attorney, Agent, or Firm* — K&L Gates LLP (57) ABSTRACT

Systems and methods for managing access to a computer account of a computer system that is not associated with a human user. The system comprises a password repository for storing a password for the computer account. The password is preferably encrypted with at least two secrets. The system also comprises a first data storage device for storing the first secret and a second data storage device for storing the second secret. The system additionally comprises a computer device in communication with the password repository and the first and second data storage devices for managing access to the computer account. The computer device is programmed to, in response to a request to perform an action under the computer account: (i) retrieve the first secret from the first data storage device; (ii) retrieve the second secret from the second data storage device; and (iii) decrypt the password with the first second secrets.

8 Claims, 6 Drawing Sheets

SYSTEM AND METHOD FOR MANAGING SERVICES AND JOBS RUNNING UNDER PRODUCTION IDS WITHOUT EXPOSING PASSWORDS FOR THE PRODUCTION IDS TO HUMANS

BACKGROUND

Large enterprises typically have large information technology (IT) infrastructures (or systems). In an increasing number of large enterprise IT systems, various computer-based jobs, services, and applications need to be run under the context of productions IDs. Production IDs are computer accounts that are not associated with a human user. Production IDs may be used, for example, for long-lived applications and services that cannot or are not run from human ID accounts. The security and management of production IDs on certain computer or server platforms, such as a Windows® platform, is troublesome, in part, because administrators for such platforms must have knowledge of clear text passwords for the production IDs. Because production IDs typically have higher privileges than user IDs, direct use of production IDs can be detrimental to the overall security of the infrastructure.

SUMMARY

In one general aspect, the present invention is directed to systems and methods for managing access to a computer account of a computer system that is not associated with a human user. Such an account is referred to as a "production ID" below. According to various embodiments, the system comprises a password repository for storing a password for the computer account. The password is preferably encrypted with at least two secrets. The system also comprises a first data storage device for storing the first secret and a second data storage device for storing the second secret. The system additionally comprises a computer device in communication with the password repository and the first and second data storage devices for managing access to the computer account (or production ID). The computer device is programmed to, in response to a request to perform an action under the computer account: (i) retrieve the first secret from the first data storage device; (ii) retrieve the second secret from the second data storage device; and (iii) decrypt the password with the first second secrets.

In this process, the password is not exposed to a human user, e.g., an administrator requesting to take action under the production ID. Preferably, a first group of users is authorized to access the first storage device, a second group of users is authorized to access the second storage device, and the first and second groups do not contain a user that is a member of both the first and second groups. That way, no user is authorized to access both secrets used to encrypt/decrypt the password. As a result, the proposed architecture is capable of enforcing separation of duties; no user is allowed access to more than one of the three components (e.g., the encryption key store, the initialization vector store, and the encrypted password store) that comprise the system. This separation of duties ensures that three separate domain administrators must collude to comprise the security and integrity of the system.

Mechanisms for bootstrapping the production IDs are also disclosed.

FIGURES

Various embodiments of the present invention are described herein by way of example in conjunction with the following figures, wherein.

DETAILED DESCRIPTION

Figure 1:
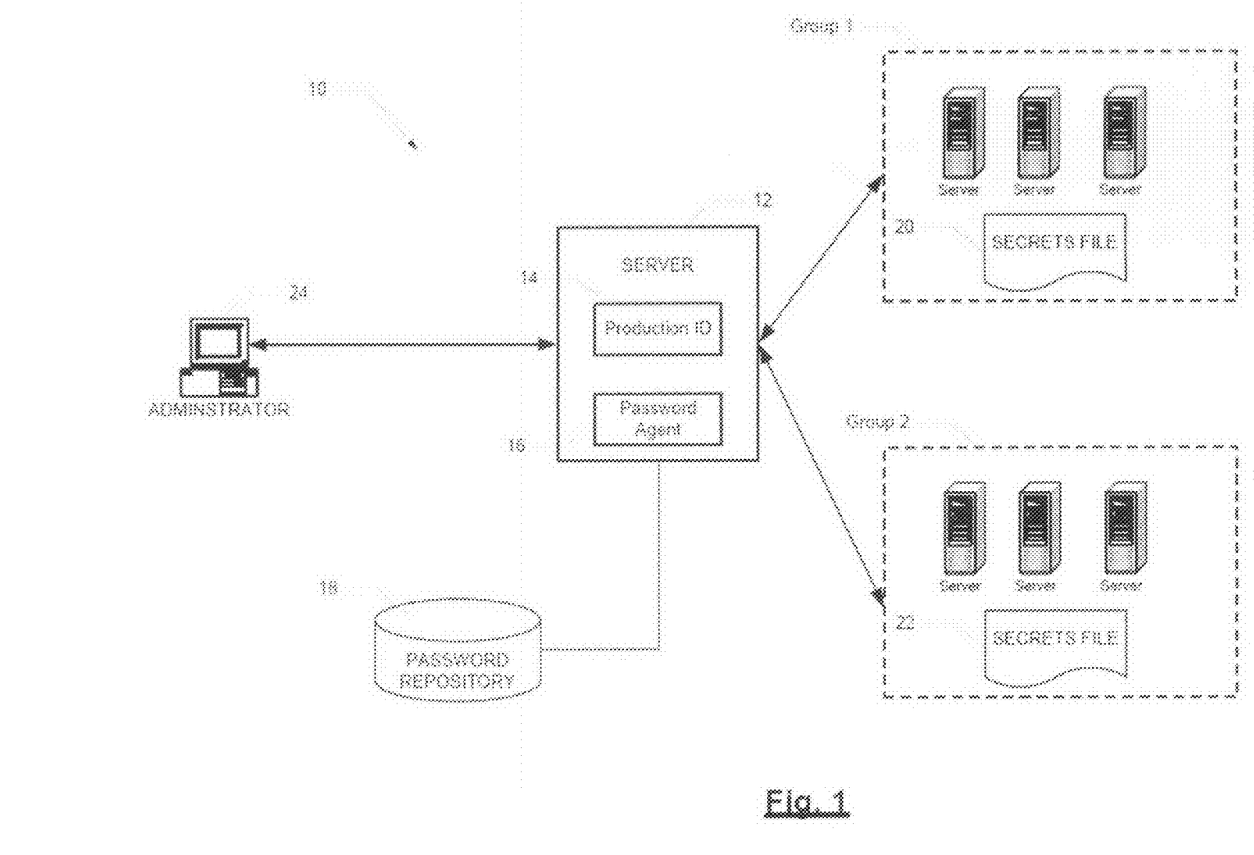
FIGS. 1 and 5 are diagrams of systems for managing access to production IDs according to various embodiments of the present invention.

As mentioned above, production IDs can be considered computer accounts that are not associated with a human user. Many large enterprise IT systems utilize production IDs for different types of software-based applications and services that cannot or are not run from human ID accounts. FIG. 1 is a diagram of a computer-based system 10 for managing software-based applications and jobs running under production IDs without having to expose the password for the production IDs to humans, such as administrators of the IT system of which the system 10 is a part. As shown in FIG. 1, the system 10 may comprise a server 12 or other types of computer devices or targets that have a production ID 14 associated with it. The server 12 may also comprise a password agent 16 that aids in implementing the protocol to run applications and jobs under the production ID 14 without having to disclose the password for the production ID 14 to human users.

The password for the production ID 14 may be stored in a password repository 18. The repository 18 may comprise one or a number of databases or files for storing passwords for production IDs of the IT system. Preferably, the passwords stored in the repository 18 are encrypted with at least two secrets, with each secret being stored in a separate file 20, 22. The secrets files 20, 22 may be implemented as or stored on any suitable digital data storage device, such as a memory or hard disk.

Preferably, no human user associated with the enterprise IT system is entitled to access both of the files 20, 22. That is, a first group of users, such as database administrators who administer database equipment in Group 1, may be entitled or authorized to access the secrets file 20 but not the secrets file 22, and a second group of users, such as UNIX administrators or some other user group who administer UNIX-based equipment in Group 2, is entitled to access secrets file 22 but not file 20. In addition, preferably no human user is a member of both groups. That way, no user is authorized to access both secrets, which could be used to decrypt the password for the production ID 14. It should be noted that the examples above of database administrator and UNIX administrators having access to different groups of computer equipment in an enterprise IT system is but one example, and other groups of users could be defined as needed to suit the purposes of the IT system.

The password agent 16 may be implemented as software code stored on a computer-readable medium (not shown) of the server 12 and executed by a processor(s) (not shown) of the server 12. The computer readable medium may be, for example, random access memory (RAM), read-only memory (ROM), a magnetic medium, such as a hard drive or floppy disk, or an optical medium, such as a CD-ROM. The processor(s) may comprise a single or multiple core processor(s). In addition, although only one production ID is shown associated with the server 12, it should be noted that their may be numerous production IDs associated with the server 12, and the password agent 16 may manage access for each.

Figure 2:
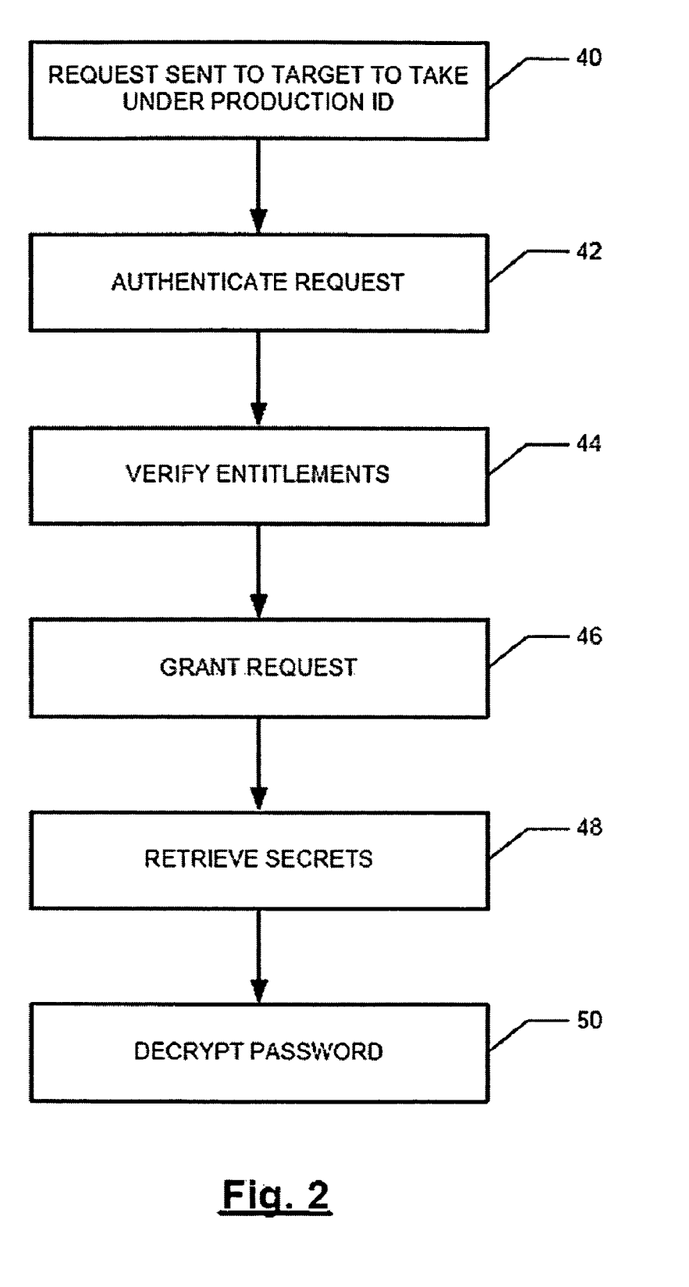
FIGS. 2-4 and 6 are diagrams of processes flows of the systems according to various embodiments of the present invention.

FIG. 2 is a diagram of the process flow that may be implemented by the system 10 when a user, such as an administrator at client device 24 wants to run an application or service under the production ID 14. At step 40, the administrator, at client device 24, sends a message to the target (e.g., server 12) via network (not shown), such as a LAN, WAN, or MAN. The message from the administrator may be a request to take some action under the production ID 14, such as to configure a resource. At step 42, upon receipt of the request, the password agent 16 may authenticate the request and, if the request is authenticated, at step 44, the password agent 16 may attempt to verify the administrator's entitlements. IT-based systems for user authorization and entitlement verification are well known in the IT industry and are not further described herein.

If the administrator is entitled to take the requested action with respect to the production ID 14, at step 46 the target 12 may grant the request. At that point, at step 48, the password agent 16 may retrieve the two secrets from the secrets files 20, 22 to decrypt the password for the production ID 14. Then, at step 50, the password agent 16 may retrieve and decrypt the password stored in the password repository 18. Once the password is decrypted, the action under the production ID requested by the administrator may be performed. As can be seen, the password for the production ID 14 is not disclosed to the requesting administrator at any time during the process.

The security of the password for the production ID 14 is enhanced if no human user associated with the IT system is a member of both Group 1 and Group 2 so that no human user associated with the IT system is authorized to access both secrets files 20, 22. Users from each group could, however, compromise the security by collaborating to obtain the secrets from each file 20, 22. Preferably, however, the users (e.g., administrators) who are members of Group 1 and Group 2 who have access to one of the secrets files are highly trusted users of the IT system so that this risk is reduced.

Figure 3:
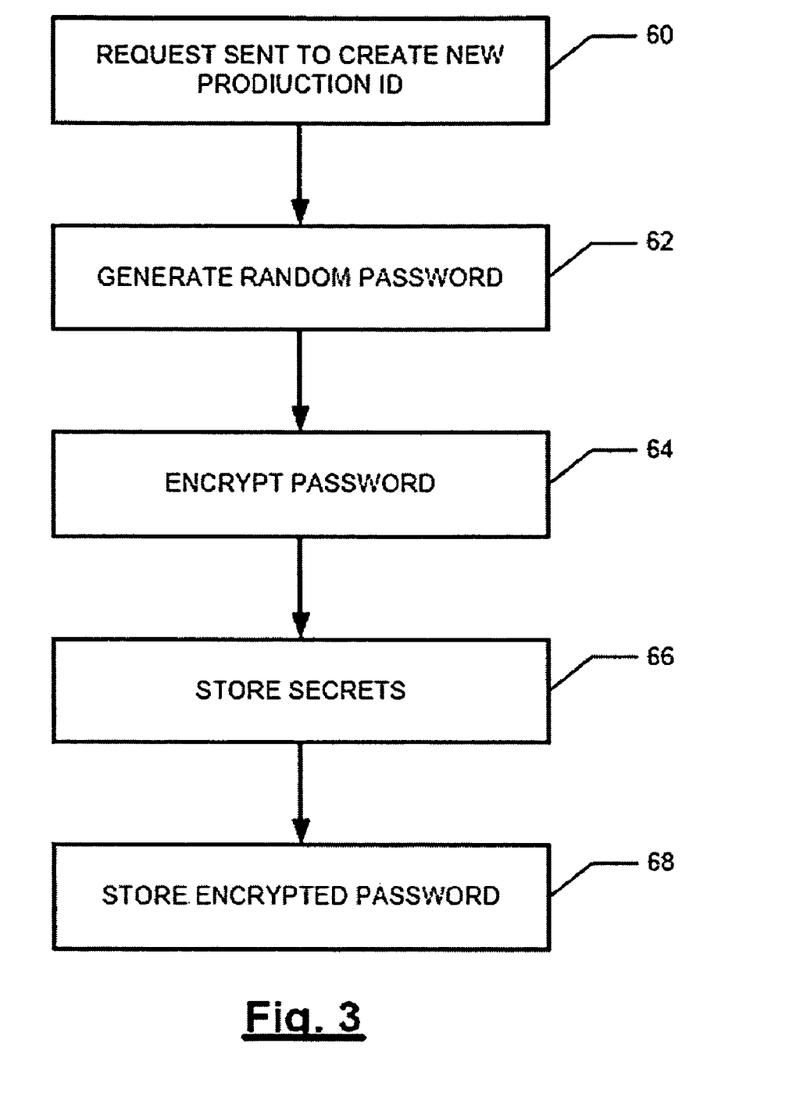

FIG. 3 is a diagram of a process flow that may be used to create a password for a new production ID according to various embodiments of the present invention. At step 60, the administrator, at client device 24, sends a request to the password agent 16 to create a new production ID. In response to the request, at step 62, the password agent 16 may generate a random password for the new production ID. Then, at step 64, the password agent 16 may encrypt the password using at least two different secrets. At step 66, the password agent 16 may then store the different secrets in separate secrets files 20, 22 that are accessible by different and non-overlapping groups of users, as described above. Then, at step 68, the password agent 16 may store the encrypted password in the password repository 18. Again, at no time in this process is the privileged password for the new production ID exposed to a human user.

Figure 4:
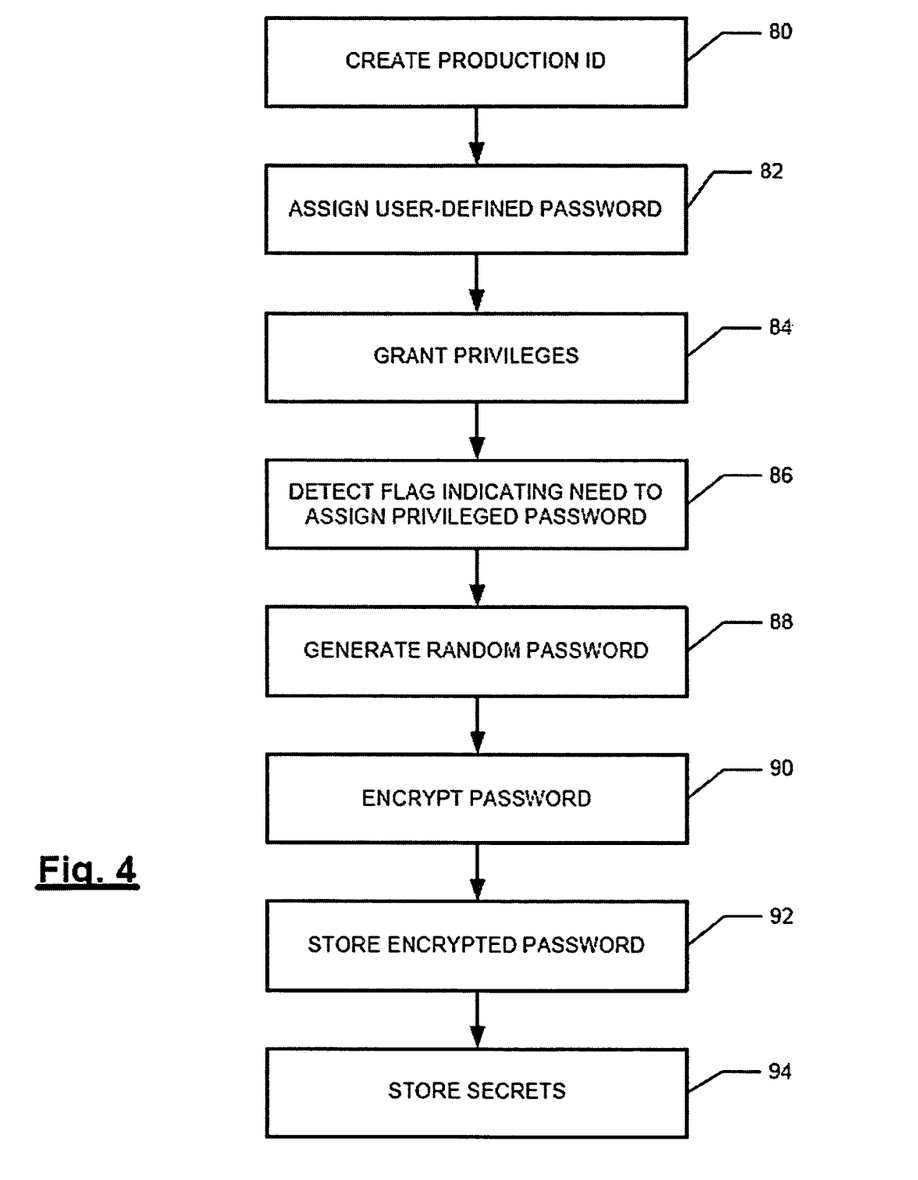

FIG. 4 is a diagram of a process flow that may be used create the password for the password agent 16 when it is created. At step 80, a user, such as an administrator at the client device 24, may create the production ID for the password agent 16 at the server 12 and, at step 82, assign it a user-defined password. At step 84, the user may then grant all necessary privileges to the production ID. At this point, there is no privileged (i.e., non-human-exposed) password for the production ID stored in the password repository 18.

At step 86, when the password agent 16 starts running for the first time, it may detect a flag indicating that it needs to assign itself a privileged password. So, at step 88, it may then generate a random password. At step 90, it may encrypt the new password with two secrets. At step 92, it may then stored the encrypted password in the password repository 18 and, at step 94, store the secrets used to encrypt the password in the separate secrets files 20, 22.

Preferably, the random generated password for the production ID overrides the initial well-known password in the global authentication repository 18 and any process running as the production ID is configured with the newly generated random password. In addition, preferably all authentication of any process running as the production ID is authenticated using secure authentication protocols, such as Kerberos. Further, the codebase that implements the software infrastructure (e.g., the password agent 16) is secured from tamper and modification, and appropriately authorized for use.

Figure 5:
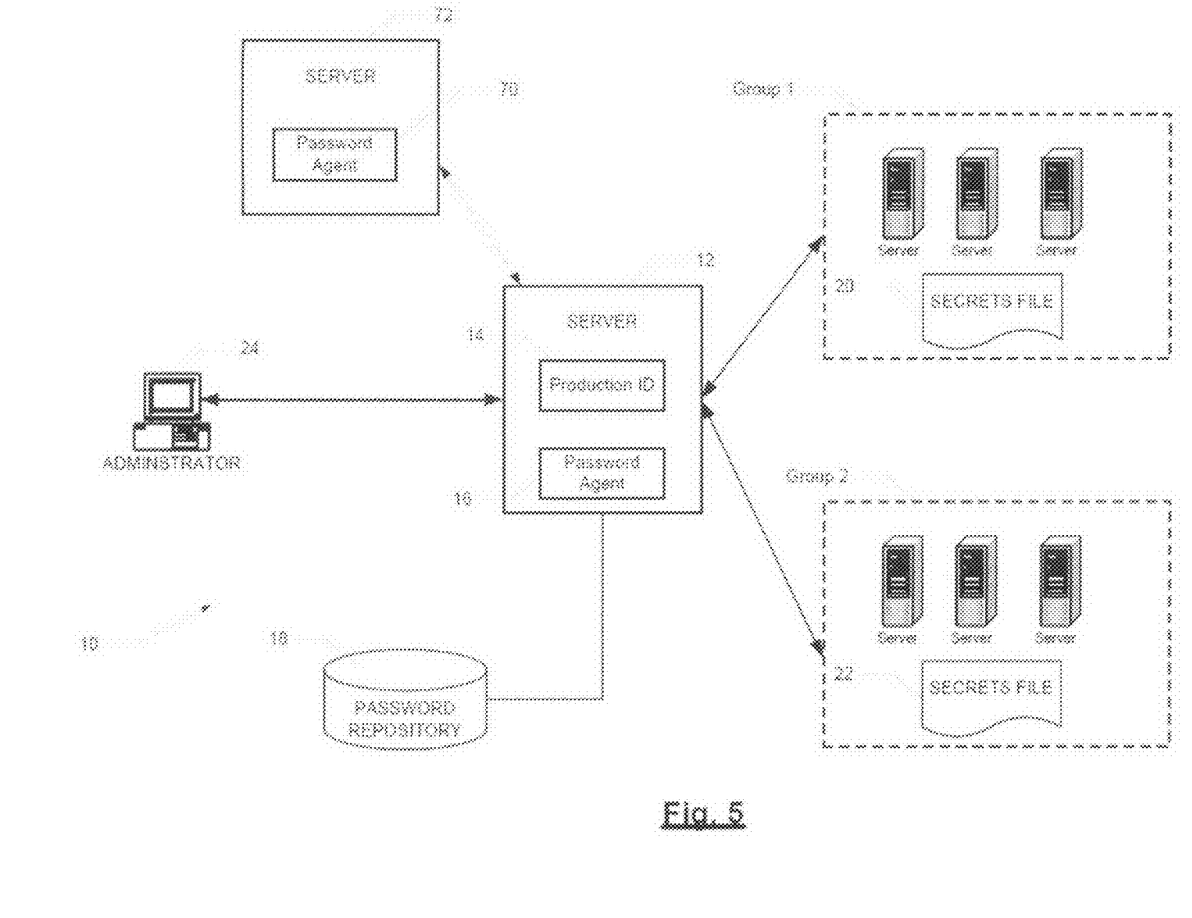
Figure 6:
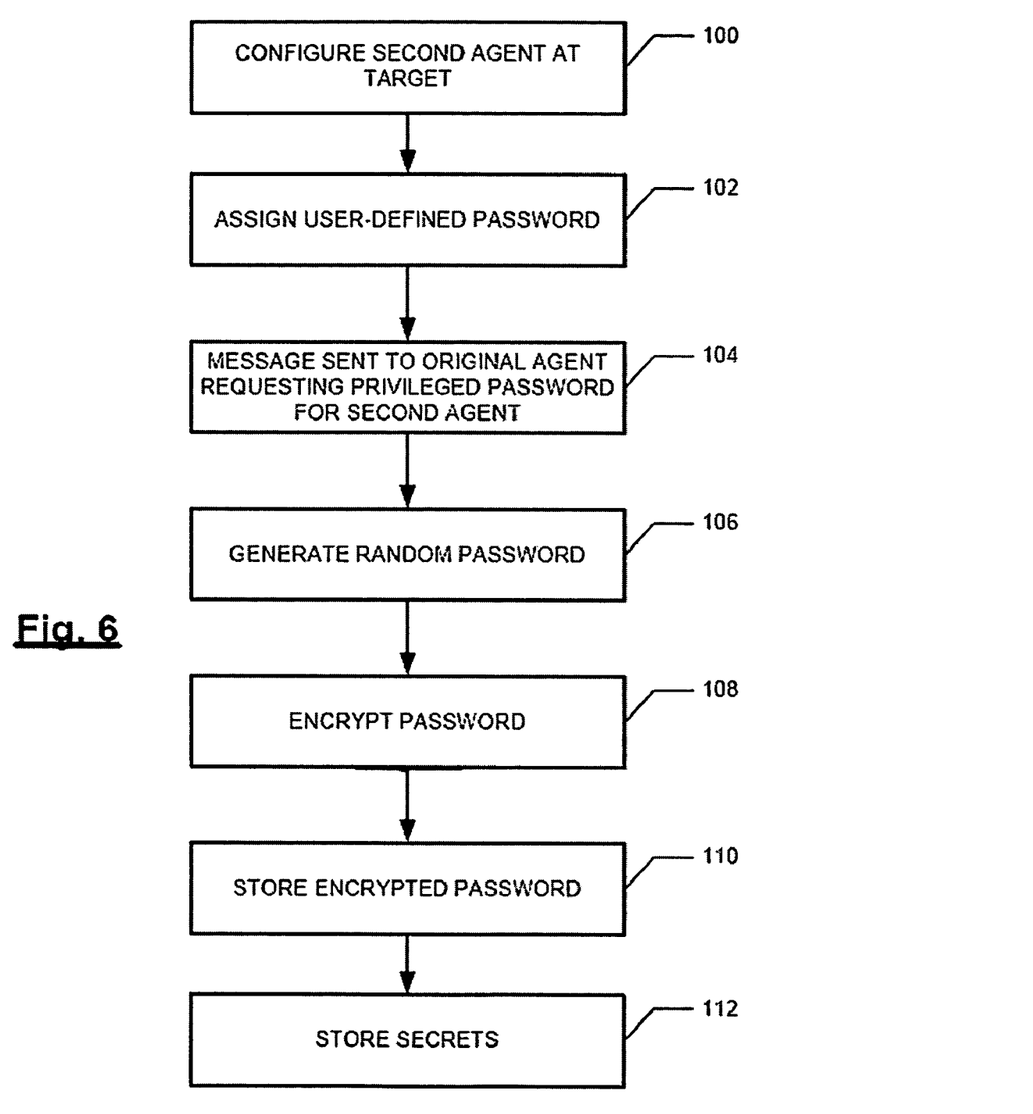

In a large enterprise, there may be hundreds or even thousands of such password agents 16 throughout the enterprise IT system. FIGS. 5 and 6 illustrate a process that may be used to assign privileged IDs to subsequent instances of the password agent in the enterprise IT system. At step 100, the second (or subsequent) instance of the password agent 70 may be configured at the desired target (e.g., server 72) within the enterprise IT system. At step 102, the second password agent 70 may be assigned a non-privileged ID. Then, at step 104, a message may be sent to the original (or any prior) password agent 16 requesting that the original password agent 16 assign a privileged (non-human-exposed) password to the new password agent 70. The original password agent 16 may then: at step 106, generate a random privileged password for the new password agent 70; decrypt the random password with at least two secrets at step 108; store the decrypted password in the password for the new password agent 70 in the password repository at step 110; and store the secrets in separate secrets files 20, 22 at step 112.

The examples presented herein are intended to illustrate potential and specific implementations of the embodiments. It can be appreciated that the examples are intended primarily for purposes of illustration for those skilled in the art. No particular aspect or aspects of the examples is/are intended to limit the scope of the described embodiments. It is to be understood that the figures and descriptions of the embodiments have been simplified to illustrate elements that are relevant for a clear understanding of the embodiments, while eliminating, for purposes of clarity, other elements. For example, certain operating system details for computer system are not described herein. Those of ordinary skill in the art will recognize, however, that these and other elements may be desirable in a typical computer system. Because such elements are well known in the art and because they do not facilitate a better understanding of the embodiments, a discussion of such elements is not provided herein.

In general, it will be apparent to one of ordinary skill in the art that at least some of the embodiments described herein may be implemented in many different embodiments of software, firmware and/or hardware. The software and firmware code may be executed by a processor or any other similar computing device. The software code or specialized control hardware that may be used to implement embodiments is not limiting. For example, embodiments described herein may be implemented in computer software using any suitable computer software language type, such as, for example, C or C++ using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semipermanent, and/or semitemporary. A computer-readable medium may further include one or more data signals transmitted on one or more carrier waves.

A "computer," "computer system," "host," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

While various embodiments have been described herein, it should be apparent that various modifications, alterations, and adaptations to those embodiments may occur to persons skilled in the art with attainment of at least some of the advantages. For example, various steps described in the processes above may be performed in different orders or at the same time. The disclosed embodiments are therefore intended to include all such modifications, alterations, and adaptations without departing from the scope of the embodiments as set forth herein.

What is claimed is:

1. A system for managing access by a first computer account to a second computer account of a computer system, the system comprising:
   a password repository for storing a an encrypted password for the second computer account, wherein the second computer account is not associated with a human user and wherein an initial password is encrypted with at least a first secret and a second secret to generate the encrypted password;
   a first data storage device for storing the first secret, wherein a first group of users is authorized to access the first storage device;
   a second data storage device for storing the second secret, wherein a second group of users is authorized to access the second storage device, and wherein the first and second groups do not contain a user that is a member of both the first and second groups, and wherein the first data storage device is separate from the second data storage device; and
   a computer device in communication with the password repository and the first and second data storage devices, wherein the computer device is programmed to, in response to a request from the first computer account to perform an action under the second computer account:
   retrieve the first secret from the first data storage device;
      retrieve the second secret from the second data storage device; and decrypt the encrypted password with the first and second secrets without revealing the initial password to a user of the first computer account.

2. The system of claim 1, wherein the computer device is further programmed to, in response to a request to create a new computer account that is not associated with a human user: generate a random password for the new computer account; encrypt the random password with at least two secrets; and store the encrypted random password in the password repository.

3. The system of claim 2, wherein the computer device is further programmed to store the at least two secrets used to encrypt the random password of the new computer account in separate data storage devices.

4. The system of claim 1, wherein the computer device is further programmed to, in response to a request for a password for a new computer account associated with a second computer device: generate a random password for the new computer account; encrypt the random password with at least two secrets; and store the encrypted random password in the password repository.

5. A method for managing access by a first computer account to a second computer account of a computer system, the method comprising:
   in response to a request from the first computer account to perform an action under the second computer account, retrieving a first secret from a first data storage device, wherein the second computer account is not associated with a human user and wherein a first group of users is authorized to access the first storage device;
   retrieving a second secret from a second data storage device, wherein a second group of users is authorized to access the second storage device, and wherein the first and second groups do not contain a user that is a member of both the first and second groups, and wherein the first data storage device is separate from the second data storage device; and
   decrypting a an encrypted password for the second computer account stored in a password repository with the first and second secrets without revealing the decrypted password to a user of the first computer account.

6. The method of claim 5, further comprising, in response to a request to create a new computer account that is not associated with a human user: generating a random password for the new computer account; encrypting the random password with at least two secrets; and storing the encrypted random password in the password repository.

7. At least one nontransitory computer readable medium having instructions stored thereon that, when executed by a processor, cause the processor to:
   in response to a request from a first computer account to perform an action under a second computer account of a computer system, wherein the second computer account is not associated with a human user, retrieve a first secret from a first data storage device, wherein a first group of users is authorized to access the first storage device;
   retrieve a second secret from a second data storage device, wherein a second group of users is authorized to access the second storage device, and wherein the first and second groups do not contain a user that is a member of both the first and second groups, and wherein the first data storage device is separate from the second data storage device; and
   decrypt a an encrypted password stored in a password repository for the second computer account with the first and second secrets without revealing the decrypted password to a user of the first computer account.

8. The at least one nontransitory computer readable medium of claim 7, having further stored thereon instructions that when executed by the processor, cause the processor to, in response to a request to create a new computer account that is not associated with a human user: generate a random password for the new computer account; encrypt the random password with at least two secrets; and store the encrypted random password in the password repository.

* * * * *

UNITED STATES PATENT AND TRADEMARK OFFICE
CERTIFICATE OF CORRECTION

| | | |
|---|---|---|
| PATENT NO. | : 8,402,522 B1 | Page 1 of 1 |
| APPLICATION NO. | : 12/148148 | |
| DATED | : March 19, 2013 | |
| INVENTOR(S) | : Keis et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1066 days.

Signed and Sealed this
Twenty-eighth Day of October, 2014

Michelle K. Lee
*Deputy Director of the United States Patent and Trademark Office*